United States Patent [19]

Ichihara et al.

[11] Patent Number: 4,496,887
[45] Date of Patent: Jan. 29, 1985

[54] DIRECT-CURRENT BRUSHLESS MOTOR

[75] Inventors: Noboru Ichihara, Kasukabe; Isamu Takehara, Soka, both of Japan

[73] Assignee: Japan Servo Co., Ltd., Tokyo, Japan

[21] Appl. No.: 469,783

[22] Filed: Feb. 25, 1983

[30] Foreign Application Priority Data

Mar. 10, 1982 [JP] Japan ................................. 57-36652
Mar. 10, 1982 [JP] Japan ................................. 57-36653
May 13, 1982 [JP] Japan ................................. 57-79192

[51] Int. Cl.³ ............................................. H02P 1/18
[52] U.S. Cl. .................................... 318/254; 310/156; 310/184
[58] Field of Search .................. 318/138, 254, 254 A; 310/46, 68 R, 156, 178, 180, 181, 187, 216, 184

[56] References Cited

U.S. PATENT DOCUMENTS 3,873,897  3/1975  Müller ....................... 318/254 A X
3,956,678  5/1976  Byrne et al. ....................... 318/138
4,217,508  8/1980  Uzuka ............................. 318/254 X

FOREIGN PATENT DOCUMENTS 0166473  12/1980  Japan ................................. 318/254

Primary Examiner—J. V. Truhe
Assistant Examiner—Bentsu Ro
Attorney, Agent, or Firm—James E. Nilles

[57] ABSTRACT

A DC brushless motor wherein each of circular-arc pole shoes of a stator arranged facing a rotor having a cylindrical permanent magnet with N- and S-poles magnetized alternately around the circumference thereof has a narrow groove extending along almost half the length of the arc from one end thereof near the surface facing the permanent magnet. The permanent magnet provided for the rotor is constituted in such a manner that the radius of its surface facing the stator varies continuously over the length of arc of each pole shoe from one end thereof to the other.

3 Claims, 14 Drawing Figures

PRIOR ART FIG. 1(a)
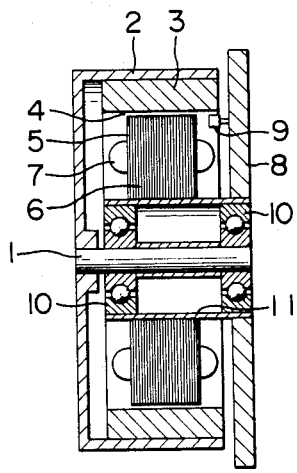
FIG. 1(b)
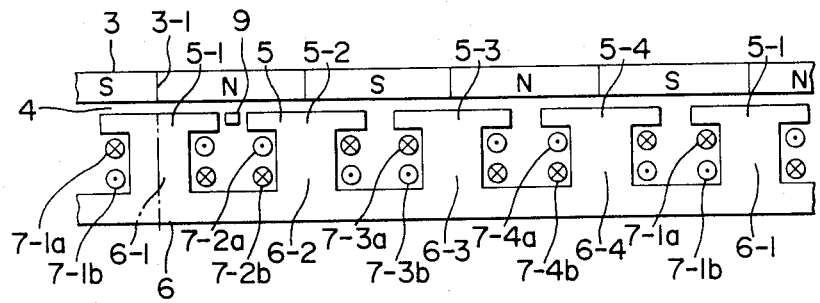
FIG. 1(c)
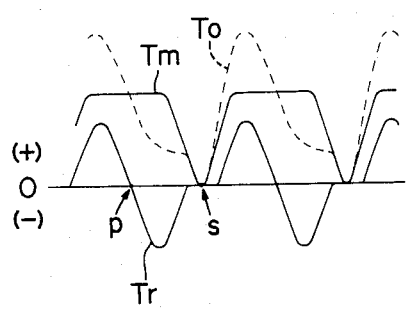
FIG. 1(d)
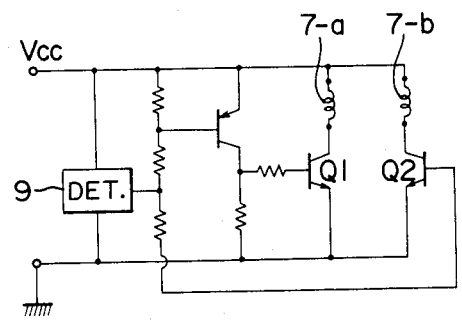

F I G. 2(a)
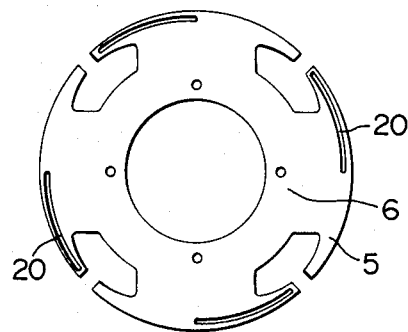
F I G. 2(b)
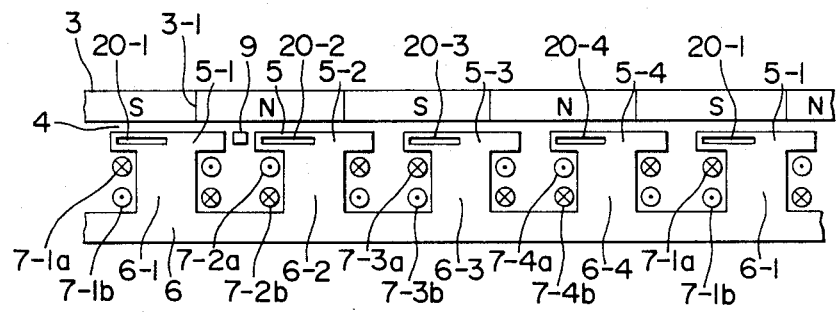
F I G. 2(c)
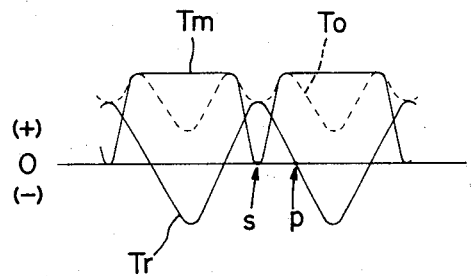

DIRECT-CURRENT BRUSHLESS MOTOR

BACKGROUND OF THE INVENTION

1. Field of the Invention

The present invention relates to an improvement in a direct-current brushless motor, and more particularly, to an improvement in the motor of the type wherein a current is applied to windings provided around a stator through an electrification control unit to drive a rotor.

2. Description of the Prior Art

FIG. 1(a) is an illustration of a conventional DC brushless motor, wherein numeral 1 represents a rotor shaft, 2 a rotor hub fixed to this rotor shaft 1, 3 a cylindrical permanent magnet which is fixed to the rotor hub 2 and which has N- and S-poles magnetized alternately around the circumference thereof, 4 a gap, 6 a stator yoke opposite to said rotor hub 2 across the gap 4, 5 a pole shoe provided at each of magnetic poles provided radially on the stator yoke 6, 7 a stator winding, 9 a magnetic detector detecting the magnetic flux of the permanent magnet 3, 10 a bearing of the rotor shaft 1, 11 a bracket holding the bearing 10, and numeral 8 a base plate supporting the bracket.

The rotor hub 2, which is made of a magnetic material, serves also as the yoke of the permanent magnet 3 and is supported rotatably by the bearing 10.

The relationship between the stator and the rotor is shown in a developed view in FIG. 1(b).

FIG. 1(b) illustrates an example wherein the permanent magnet 3 and the stator yoke 6 are each provided with four magnetic poles. That is, the stator yoke 6 is provided with magnetic poles 6-1 to 6-4 at equal pitches, and pole shoes 5-1 to 5-4 are formed at the ends of the magnetic poles 6-1 to 6-4, respectively, projecting to both sides of the magnetic poles 6-1 to 6-4, while the gap 4 between the shoes and the permanent magnet 3 facing them is fixed in size. Stator windings 7-1a to 7-4a and 7-1b to 7-4b, separated into two groups, are wound around the magnetic poles 6-1 to 6-4, respectively, each winding is separated into groups (a) and (b) and connected to form two sets of windings, which are connected to a driving circuit as shown in FIG. 1(d).

The rotational power of this motor is, as shown in FIG. 1(c), a resultant torque. To made up of a reluctance torque Tr produced by the changes in the magnetic resistance between the permanent magnet 3 and the pole shoe 5, and an electromagnetic torque Tm produced by the current flowing through the stator winding 7. The change is the magnetic resistance between the permanent magnet 3 and the pole shoe 5 is caused by variations in the area of the permanent magnet 3 that faces the pole shoe 5 according to the position of the magnet, even when the size of the gap 4 between them is fixed.

The areas of the N- and S-poles facing each pole shoe becomes equal, and the reluctance torque becomes zero, when the border line 3-1 between two N- and S-poles of the permanent magnet 3 is in alignment with the center line of the pole shoe 5-1 as shown in FIG. 1(b). This corresponds to point P in FIG. 1(c).

The reluctance torque Tr changes as shown in FIG. 1(c): it becomes zero at point P, is positive to the left of that point and negative to the right thereof, becomes a maximum value at a certain position, and becomes zero when between the pole shoes 5-1 and 5-2. Meanwhile, in the driving circuit shown in FIG. 1(d), the detection of an N-pole by the magnetic detector 9 makes a transistor $Q_1$ conductive and this makes a current flow in the winding 7-a, generating N-poles in the pole shoes 5-1 and 5-3. At the same time, the parts of the permanent magnet having N-poles facing the N-poles thus generated repel them while the parts with S-poles attract them, and thus the permanent magnet is moved toward the right. S-poles are generated in the pole shoes 5-2 and 5-4 in the same way, the parts of the permanent magnet having S-poles which face the S-poles thus generated repel them, while the parts with N-poles attract them, and the permanent magnet is moved toward the right. When the border line 3-1 arrives at a position of the magnetic detector 9, the output of the magnetic detector 9 becomes zero, the transistor $Q_1$ is turned off, and the electromagnetic torque Tm becomes zero at point S in FIG. 1(c). A transistor $Q_2$ is then turned on to pass a current through the winding 7-b and generate the electromagnetic torque Tm. Accordingly, the resultant torque To of the motor shown in FIG. 1(a) has the waveform shown by the broken line in FIG. 1(c), and in the vicinity of point S which is the midposition of the pole shoes, there is a place where the resultant torque becomes zero, which brings about the defect that self-starting of the motor could be impossible, depending on the position of the rotor.

SUMMARY OF THE INVENTION

The present invention is designed to remove this defect of the conventional motor, offering a motor which generates a sufficient self-starting torque, whatever position the rotor is in.

Another purpose of the present invention is to obtain a direct-current brushless motor which is characterized in that it comprises a rotor having a cylindrical permanent magnet with N- and S-poles magnetized alternately around its circumference, circular-arc pole shoes arranged facing said rotor with a gap there between, a stator yoke provided with a plurality of radial stator magnetic poles supporting said pole shoes, stator windings wound round each of the stator poles, and an electrification control unit which detects the magnetic flux of the permanent magnet of the rotor and delivers an output based thereon to make a current flow through said windings in sequence to drive the rotor, and in that the circular-arc pole shoes have narrow grooves extending for almost half the lengths of the arcs from one end thereof near the surface facing the permanent magnet.

Still another purpose of the present invention is to obtain a DC brushless motor characterized in that it comprises a rotor having a cylindrical permanent magnet with N- and S-poles magnetized alternately around the circumference thereof, circular-arc pole shoes arranged facing said rotor with a gap there between, a stator yoke provided with a plurality of radial stator magnetic poles supporting said pole shoes, stator windings wound round each of the stator poles, and an electrification control unit which detects the magnetic flux of the permanent magnet of the rotor and delivers an output based thereon to make a current flow through said windings in sequence to drive the rotor, and in that the permanent magnet provided for the rotor is constituted in such a manner that the radius of the surface facing the stator varies continuously over the length of arc of each pole from one end thereof to the other.

Yet another purpose of the present invention is to obtain a DC brushless motor characterized in that it comprises a rotor having a cylindrical permanent magnet with N- and S-poles magnetized alternately around the circumference thereof, circular-arc pole shoes arranged facing said rotor with a gap therebetween, a stator yoke provided with a plurality of radial stator magnetic poles supporting said pole shoes, stator windings wound round each of the stator poles, and an electrification control unit which detects the magnetic flux of the permanent of the rotor and delivers an output based thereon to make a current flow through said windings in sequence to drive the rotor, in that the circular-arc pole shoes have narrow grooves extending for almost half the lengths of the arcs from one end thereof near the surface facing the permanent magnet, and in that the permanent magnet provided for the rotor is constituted in such a manner that the radius of the surface facing the stator varies continuously over the length of arc of each pole from one end thereof to the other. Other purposes and characteristics of the present invention will be made clear below, together with an explanation of the figures.

BRIEF DESCRIPTION OF THE DRAWINGS

FIG. 1(a) is a sectional view of a conventional DC brushless motor;

FIGS. 1(b), 1(c) and 1(d) are drawings explaining the operation of the motor;

FIG. 2(a) is a section of a stator core of a DC brushless motor offered by the present invention;

FIGS. 2(b) and 2(c) are drawings explaining the operation thereof;

DESCRIPTION OF THE PREFERRED EMBODIMENTS

Figure 3A:
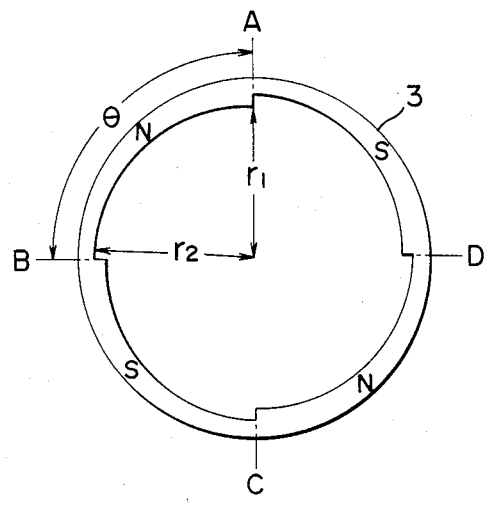
FIG. 3(a) is a side view of the permanent magnet of a DC brushless motor in another embodiment of the present invention.

As shown in FIG. 2(a), in the present invention, the pole shoes are each provided with a narrow groove 20 over almost half the length of the arc from one end thereof near the surface facing the permanent magnet.

The developed view of FIG. 2(b) shows the relationship between the stator and the rotor of the motor for which the improved stator core of FIG. 2(a) is used.

The number of magnetic poles in the rotor and the stator is shown to be four in FIG. 2(b) in the same way as in FIG. 1(b).

Since the pole shoes 5 of the stator are each provided with a groove 20 over almost half the length of the arc from one end thereof near its surface, the halves of the arc lengths of the pole shoes provided with grooves 20 have a higher magnetic resistance than the remaining halves of the arc lengths with no grooves, while the length of the gap 4 between the pole shoes and the permanent magnet facing to it is fixed. Therefore, the permanent magnet facing the pole shoes moves to the right so that the poles face more of the parts of the pole shoes wherein the magnetic resistance is small, and the reluctance torque Tr becomes zero at a position where the magnetic resistance between the rotor and the pole shoes is a minimum. This position becomes the stable point where there is no excitation. As shown in FIG. 2(c), the relationship between the position of the rotor and the torque is such that the maximum positive value of the reluctance torque Tr occurs at a point S where the electromagnetic torque Tm generated by the current flowing through the windings becomes zero, while the maximum negative value of Tr occurs in the middle of the maximum value of Tm. Therefore the resultant torque To occurs at all times in the positive region as shown by the broken line, and thus this improved motor generates a positive rotational power at any position of the rotor and can always generate a self-starting torque.

In addition, since the gap 4 between the pole shoes 5 and the permanent magnet 3 facing them has a fixed dimension, it is easy to reduce it, and thus reduce the ampere-turns consumed in the gap. The efficiency of the motor can thereby be increased.

FIG. 3(a) illustrates a side view of the permanent magnet of the motor in another embodiment of the present invention, showing, by way of example, four magnetic poles in the same way as in FIG. 1(a).

In this embodiment of the present invention, the permanent magnet 3, although cylindrical, is formed in such a manner that the radius of the surface facing the stator varies continuously over the length of the arc of each pole so that it is a radius $r_1$ at end A and a radius $r_2$ which is larger than $r_2$ at end B. All the plurality of magnetic poles have the same form as the above, and the N- and S-poles are magnetized alternately with each of points A, B, C and D where the radius changes sharply being a boundary between the magnetic poles.

Figure 3B:
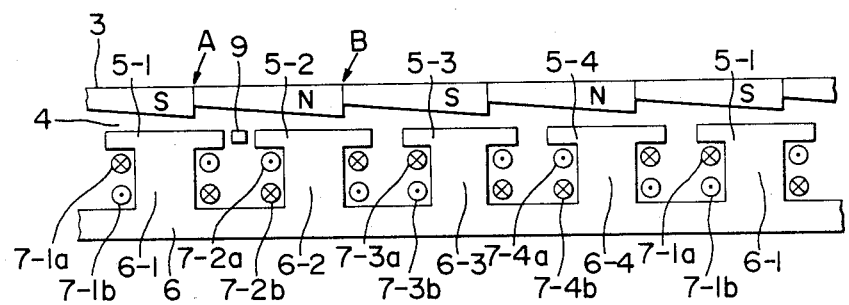
FIGS. 3(b) and 3(c) are drawings explaining the operation thereof.
Figure 3C:
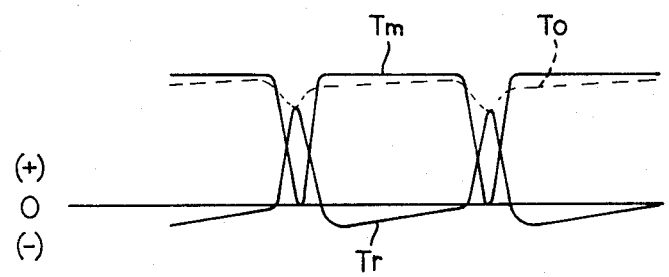

A developed view of FIG. 3(b) illustrates the relationship between the rotor and the stator of an improved motor constituted by incorporating the permanent magnet shown in FIG. 3(a) into the motor shown in FIG. 1(a). Since the radius of the permanent magnet 3 in the present invention varies continuously over the length of arc of each pole in such a manner that it is small at point A and large at point B, as shown in FIG. 3(b), the gap 4 between the pole shoes 5 and the permanent magnet 3 varies over the length of the arc A-B of one pole of said permanent magnet 3 even when the outer diameter part of the pole shoe of the stator has a uniform cylindrical form. Therefore, the waveform and generation positions of the reluctance torque Tr acting between the permanent magnet 3 and the pole shoes 5 of the stator becomes as shown in FIG. 3(c) and the maximum positive value of the reluctance torque Tr occurs at a position where the electromagnetic torque Tm generated by the current flowing the windings becomes zero, and thus the resultant torque To of the reluctance torque Tr and the electromagnetic torque Tm, is positive at all positions of the rotor as shown by the broken line, enabling the self-starting of the motor at all positions.

Figure 4:
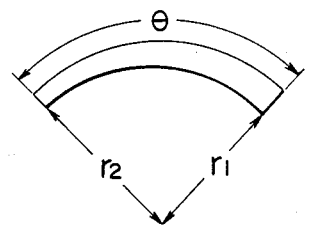
FIG. 4 is a drawing illustrating a segmented magnet.

The permanent magnet having the shape shown in FIG. 3(a) can be constituted easily by a ferrite magnet or a plastic magnet prepared by molding a magnetic powder with plastics, and it can also be constituted by fitting segment-type magnets formed for one pole as shown in FIG. 4 to the rotor hub 2.

Figure 5A:
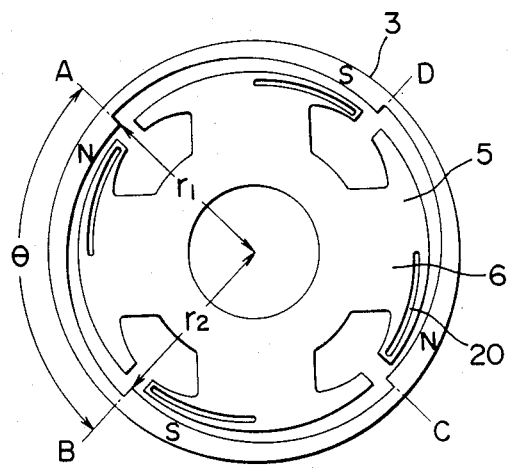
FIG. 5(a) is a side view of a stator yoke and a permanent magnet of a DC brushless motor in yet another embodiment of the present invention.
Figure 5B:
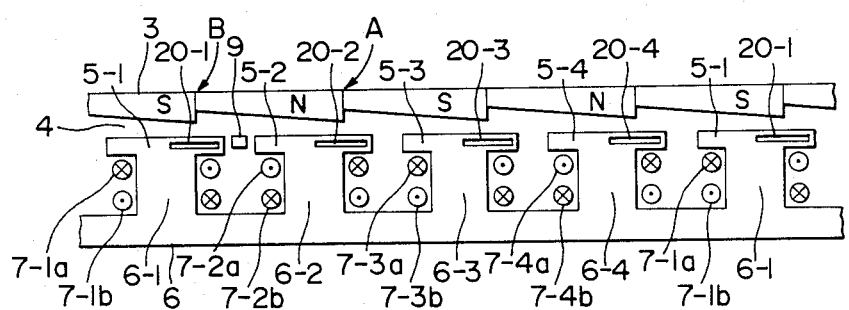
FIGS. 5(b) and 5(c) are drawings explaining the operation thereof.

In still another embodiment of the present invention, a motor is constituted by incorporating therein the stator yoke 6 and the permanent magnet 3 of the above embodiment as shown in FIG. 5(a). The relationship of the rotor and the stator of the motor in the present embodiment is shown in the developed view of FIG. 5(b).

Figure 5C:
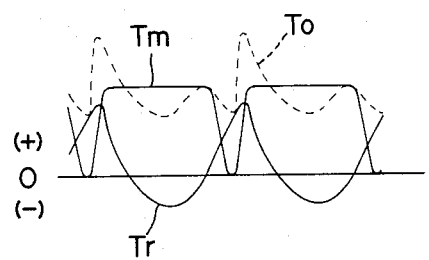

In this embodiment of the present invention, since each of the pole shoes 5 of the stator is provided with a groove 20 over almost half the length of its arc from one end thereof near the surface, the halves of the arc lengths of the pole shoes provided with grooves 20 have a higher magnetic resistance than the remaining valves of the arc lengths not provided with grooves, supposing that the dimension of the gap 4 between the pole shoe and the permanent magnet is fixed. Therefore, the permanent magnet facing the pole shoes moves to the left so each pole faces more of the parts of the pole shoes having a smaller magnetic resistance, and the reluctance torque Tr becomes zero at a position where the magnetic resistance between the rotor and the pole shoes is a minimum. This position becomes the stable point where there is no excitation. As shown in FIG. 5(a), the radius of the permanent magnet 3 varies continuously over the length of the arc of each pole in such a manner that it is smaller at point A and larger at point B. Therefore, the gap 4 between the pole shoes 5 and the permanent magnet 3 varies over the length of the arc A-B of one pole of said permanent magnet 3, even when the outer diameter part of the pole shoe of the stator has a uniform cylindrical form. Accordingly, the waveform and the generation positions of the reluctance torque Tr acting between the permanent magnet 3 and the pole shoes 5 of the stator become as shown in FIG. 5(c), the maximum positive value of the reluctance torque Tr occurs at a position where the electromagnetic torque Tm generated by the current flowing through the windings begins to decrease, and thus the resultant torque To of the reluctance torque Tr and the electromagnetic torque Tm is positive at all positions of the rotor as shown by the broken line, enabling the self-starting at all positions. In addition, the minimum value of the resultant torque To is large.

What is claimed is:

1. A DC brushless motor characterized in that it comprises a rotor having a cylindrical permanent magnet with N- and S-poles magnetized alternately around the circumference thereof, circular-arc pole shoes arranged facing said rotor with a gap therebetween, a stator yoke provided with a plurality of radial stator magnetic poles supporting said pole shoes, stator windings wound around each of said stator poles, and an electrification control unit which detects the magnetic flux of the permanent magnet of said rotor and delivers an output based thereon to make a current flow through said windings in sequence to drive said rotor, and in that each of said circular-arc pole shoes has therein a narrow groove extending along almost half the length of the arc from one end thereof near the surface facing the permanent magnet, and said narrow groove is covered with a thin layer portion of said pole shoe.

2. A DC brushless motor characterized in that it comprises a rotor having a cylindrical permanent magnet with N- and S-poles magnetized alternately around the circumference thereof, circular-arc pole shoes arranged facing said rotor with a gap therebetween, a stator yoke provided with a plurality of radial stator magnetic poles supporting said pole shoes, stator windings wound around each of said stator poles, and an electrification control unit which detects the magnetic flux of the permanent magnet of said rotor and delivers an output based thereon to make a current flow through said windings in sequence to drive said rotor, and in that the permanent magnet provided for said rotor is constituted in such a manner that the radius of its surface facing the stator varies over the length of arc of each pole from one end thereof to the other, but the radius changes sharply at a boundary between the magnetic poles to generate a starting torque of one fixed direction.

3. A DC brushless motor characterized in that it comprises a rotor having a cylindrical permanent magnet with N- and S-poles magnetized alternately around the circumference thereof, circular-arc pole shoes arranged facing said rotor with a gap therebetween, a stator yoke provided with a plurality of radial stator magnetic poles supporting said pole shoes, stator windings wound around each of said stator poles, and an electrification control unit which detects the magnetic flux of the permanent magnet of said rotor and delivers an output based thereon to make a current flow through said windings in sequence to drive said rotor, in that each of said circular-arc pole shoes has therein a narrow groove extending along almost half of the length of the arc from one end thereof near the surface facing said permanent magnet, and said narrow groove is covered with a thin layer portion and in that the permanent magnet provided for said rotor is constituted in such a manner that the radius of its surface facing the stator varies continuously over the length of arc of each pole from one end thereof to the other.

* * * * *